United States Patent [19]
Fieni

[11] 3,974,979
[45] Aug. 17, 1976

[54] DEVICE FOR A BUCKLE TYPE SAFETY BELT FOR VEHICLE

[75] Inventor: Walter Fieni, Paris, France

[73] Assignee: Societe Anonyme Francaise du Ferodo, Paris, France

[22] Filed: Aug. 20, 1974

[21] Appl. No.: 499,031

[30] Foreign Application Priority Data
Aug. 21, 1973 France .............................. 73.30302

[52] U.S. Cl. .......................... 242/107.4 R; 280/744
[51] Int. Cl.² ........................................ A62B 35/00
[58] Field of Search ............... 280/150SB; 297/389; 242/107.4 R

[56] References Cited
UNITED STATES PATENTS

| | | | |
|---|---|---|---|
| 3,606,456 | 9/1971 | Cazabon | 280/150 SB |
| 3,632,059 | 8/1971 | Loose | 280/150 SB |
| 3,847,434 | 11/1974 | Weman | 280/150 SB |

Primary Examiner—Robert R. Song
Attorney, Agent, or Firm—Kenneth S. Goldfarb

[57] ABSTRACT

A device for a buckle type safety belt for a vehicle. The device comprises a belt strap winding and unwinding device, and combined in the same mechanical unit a buckle mechanism member such as a catch, said member and the winding and unwinding device being mounted movably relative to each other so that in one position the winding and unwinding device is locked and in the other position it is released.

6 Claims, 12 Drawing Figures

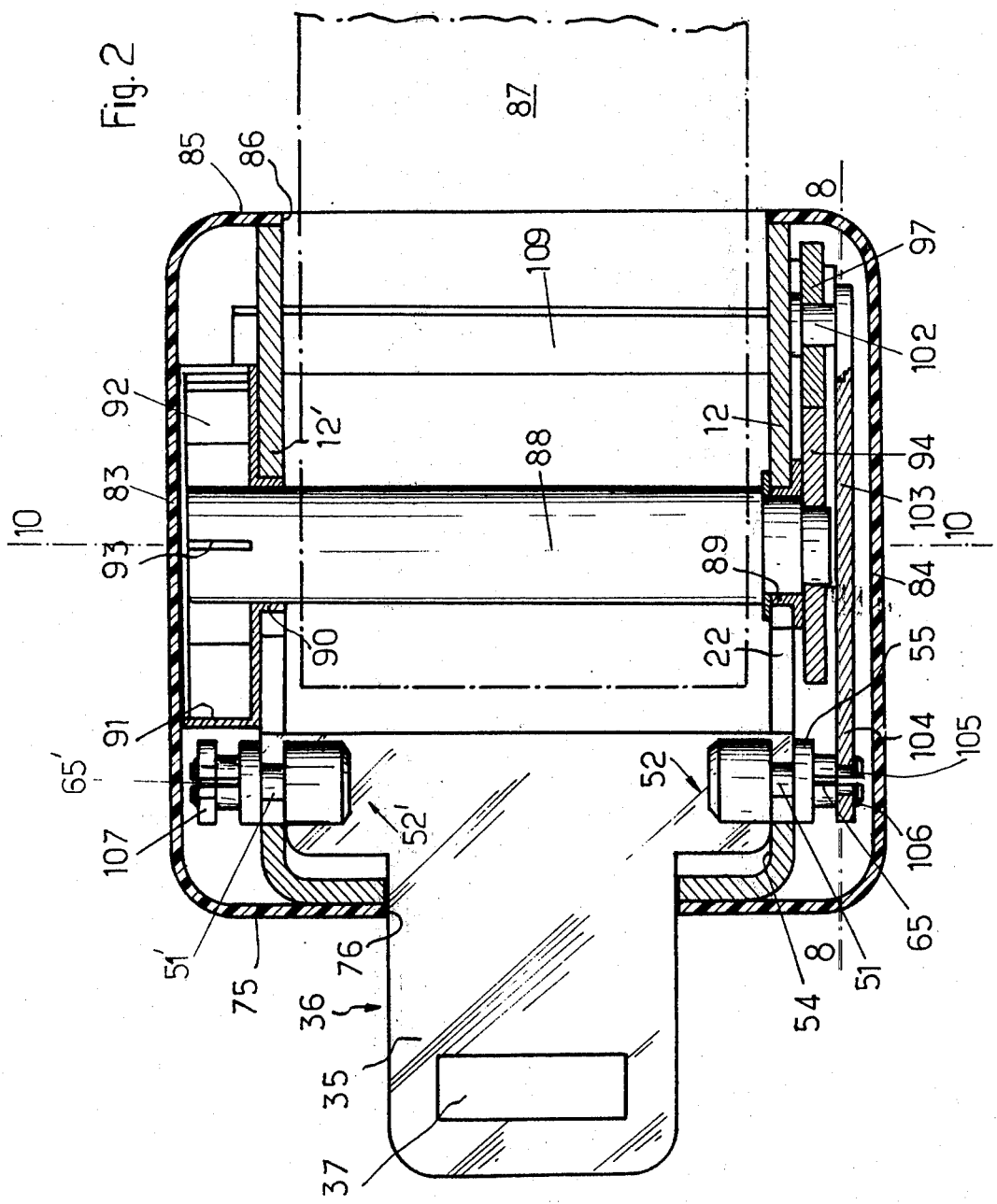

DEVICE FOR A BUCKLE TYPE SAFETY BELT FOR VEHICLE

The object of the invention is a device for a buckle type safety belts for a vehicle.

PRIOR ART

Safety belts currently in use on motor vehicles are belts having three fixing points holding a strap coming from a top fixing point or shoulder strap and another strap coming from a bottom fixing point or lap strap. Closure of the belt is normally provided at the junction between these two straps where the buckle is situated, closure being effected by joining one buckle part situated at the junction point between the shoulder strap and the lap strap and another buckle part provided on what is sometimes known as the common strap, one end of which is anchored to the bottom central fixing point.

Numerous safety belts now have a winding-unwinding device which stores the strap when the belt is not being worn and enables it to be unrolled when the user puts the belt on. Some of these winding-unwinding devices have means enabling them to be released to allow forward movements of the user's chest, with a re-wind spring restoring the belt to the safety position when the user resumes his normal position in the seat of the vehicle.

Safety belts are also known which comprise a winding-unwinding device which allows the strap to be unwound and, consequently, the user's chest to move forward as long as the vehicle is not undergoing an impact or collision but which, upon a collision locks stopping the strap from unwinding so that the belt can perform its restraining function.

In most cases, a winding-unwinding device is placed at the base of an upright of the vehicle equipped with the belt and the strap which comes from it passes onto a guide at the top part in order to join up with the shoulder strap. The additional strap forming the ascending strand is a disadvantage as, in case of an impact, because of the inherent elasticity of the strap, there is greater elastic deformation of the belt, which no longer satisfactorily fulfils its function of restraining the user in his movement towards the front of the vehicle and develops a considerable recoil force, the effects of which can be dangerous for the user.

Location of a winding-unwinding device at the top part of the shoulder strap is practically excluded when the belt comprises an energy absorber, as the most suitable position for the latter is precisely at the top part of the shoulder strap.

SUMMARY OF THE INVENTION

The device according to the invention, which is applicable to a safety belt having a buckle, eliminates these drawbacks. It is characterized by the fact that it combines in the same mechanical unit a buckle, catch or latch mechanism and a strap winding and unwinding device, the catch (or latch) and the strap winding and unwinding device being mounted movably relative to each other so that in one position the strap winding and unwinding device is locked and in the other position it is released.

The device according to the invention keeps to the safety belt having three fixing points, its simple configuration, i.e. shoulder strap and lap strap with a buckle device at the junction between these two straps and the common strap and, being separate from the anchor points, it allows the same to conserve their simple construction, or to be used for mounting an energy absorber, specially at the top anchor point.

The strain which is exerted on the buckle, catch or latch mechanism, when the belt is applied to the body of the occupant, causes locking of the strap winding and unwinding device locking being thus effected automatically, by the very act of buckling the safety belt.

The strap winding and unwinding device stores the strap forming the shoulder strap. The capacity of the device is so designed that the device, in the completely wound position, is at optimum location for being put into position.

The safety belt comprising the device is advantageously provided with a second strap winding and unwinding device for the lap strap and the invention contemplates an embodiment combining the two strap winding and unwinding devices in the same mechanical unit which comprises the buckle mechanism.

Tensioning of the belt is effected by the spring provided in the strap winding and unwinding device.

The occupant's freedom of movement, sometimes desired without removing the belt, is obtained in the simplest manner by carrying out an action by hand directly onto the case which the device comprises, using a gesture which is both simple and instinctive.

BRIEF DESCRIPTION OF THE DRAWINGS

FIG. 2 is a sectional view of the device in the plane passing through the catch;

DESCRIPTION OF PREFERRED EMBODIMENTS

Figure 1:
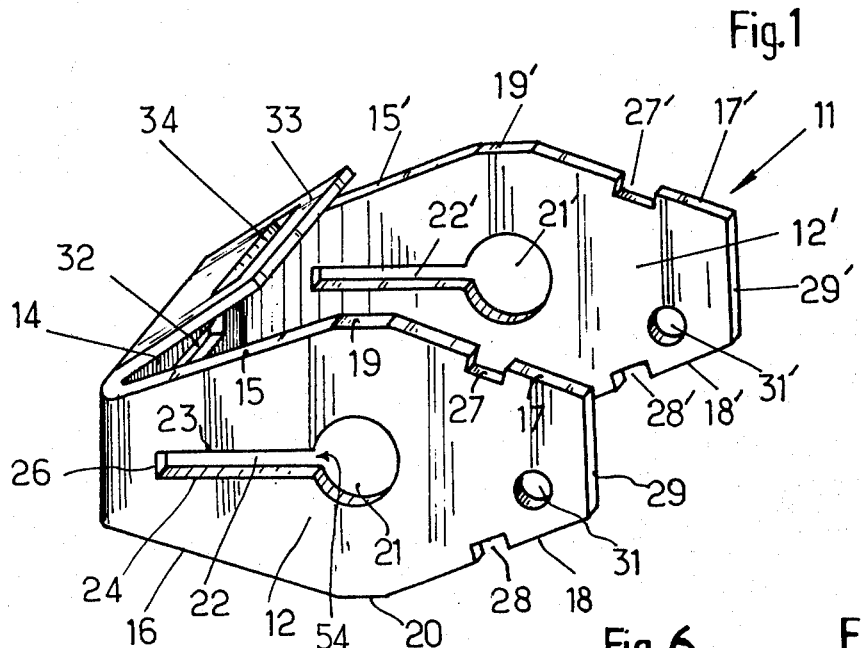
FIG. 1 is a perspective view of the frame of the device according to the invention.

In the embodiment described, the device according to the invention comprises a generally U-shaped frame 11, FIG. 1, as formed from a metal plate, having two integral side-members, 12 and 12' joined by a front wall 14 in which a rectangular opening 32 is provided, with an oblique flange 33, which depends from wall 14, having a passage 34. The side member 12 has a lozenge-shaped configuration with oblique edges 15, 16 and 17, 18 connected by flats 19 and 20. It has a circular central opening 21 extending forwards by a channel 22 the parallel edges 23 and 24 of which are symmetrical in relation to the mean longitudinal plane 25, which is the plane of the drawing in FIG. 2, and they are connected by a perpendicular edge 26. The edges 17 and 18 have rectangular notches 27 and 28 and the side member 12 is pierced near its rear edge by a circular opening 31.

The parts of side member 12' corresponding to those of side member 12 have the same references, but with the indication '.

Figure 3:
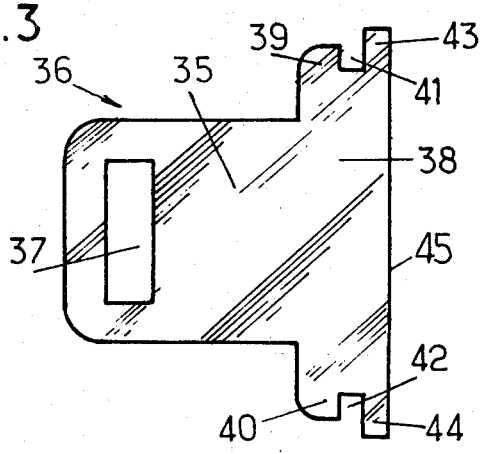
FIG. 3 is a view of the catch.

The body 35 of a catch 36 (FIG. 3) passes through opening 32, this catch having a rectangular eye 37 with which a latch is capable of cooperating. The catch body 35 is extended by a flange 38 with lateral appendages 39 and 40, rectangular grooves 41 and 42 and tabs 43 and 44 at the back edge 45 of the catch.

Figure 6:
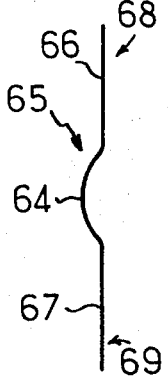
FIG. 6 is a sectional view of a leaf spring.
Figure 7:
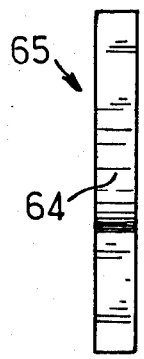
FIG. 7 is a view of said spring at 90° to the preceding view.
Figure 4:
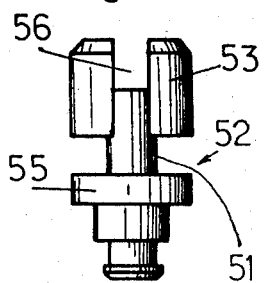
FIG. 4 is a view of a guide lug.
Figure 5:
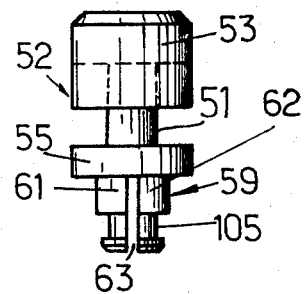
FIG. 5 is a view similar to that of FIG. 4, but at 90° to it.

The latter is guided on the side parts of its flange 38 by two guide lugs 52 and 52'. FIGS. 4 and 5, both of which have a neck, shown as 51 for lug 52, which neck is bounded at one end by a head 53 and, at the other, by a shoulder 55. The head 53, which cooperates with the internal surface 54 of the side member 12 when the neck 51 is located in channel 22, has a slot 56 of rectangular section for guiding the catch 35 by the side parts of its flange 38. The lug 52, the same as lug 52', the neck 51' of which is located in channel 22' of the side member 12', comprises, in addition to shoulder 55, a core 59 formed by two half-cores 61 and 62 separated by a longitudinal slot 63. In each of the slots 63 and 63' of the lugs 52 and 52' respectively a spring leaf (65 and 65' respectively) is located by its central curved part 64, FIGS. 6 and 7, and these each cooperate by the central parts 66 and 67 of their rectilinear members 68 and 69 with edges 70 and 71, FIG. 8 of two stops 72 and 73 forming part of a case 74 in which the frame 11 is mounted.

The case 74 is biprismatic in shape having a front wall 75 which is aligned to the front wall 14 of the frame 11 and which is perforated by a rectangular window 76 for passage of the catch body 35, two oblique faces 77 and 78 and two faces 79 and 80 of opposed obliquity being connected to the preceding faces by flats 81 and 82. The side walls 83 and 84 are plane and parallel and the rear wall 85 has an opening 86 for passage of the strap 87 forming the shoulder strap.

The latter comes from a winding-unwinding device located inside the case 74 which comprises a rolling and unrolling spindle 88 rotatably mounted in the side members 12 and 12' by means of bearings 89 and 90. Bearing 90 forms part of a housing 91 located in the space between the side member 12' of the frame and the wall 83 of the case, which contains a spiral spring 92 one end of which is engaged in a slot 93 in the spindle 88.

Figure 9:
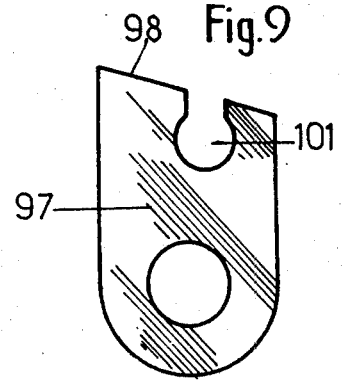
FIG. 9 is a view of a pawl.
Figure 8:
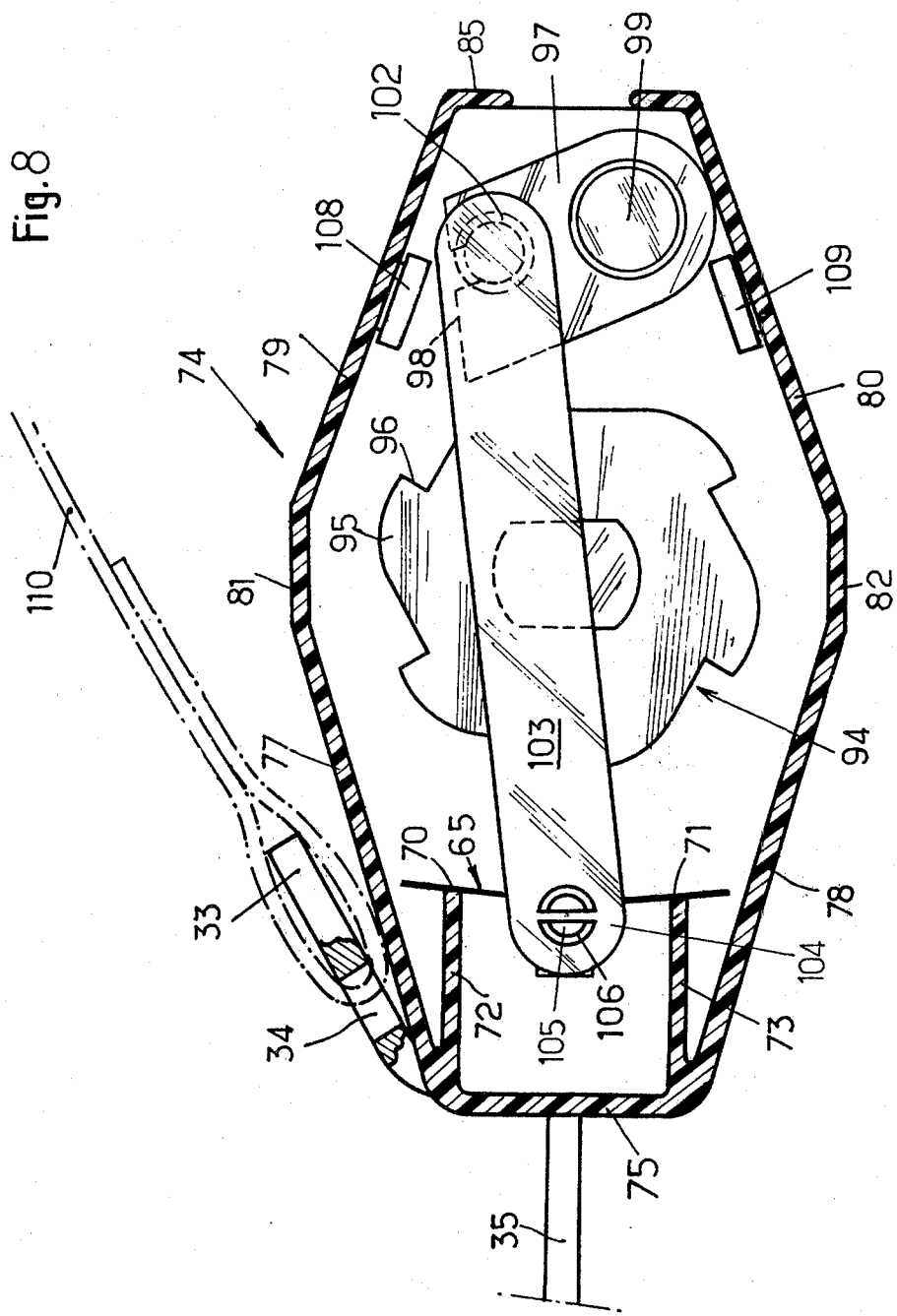
FIG. 8 is a sectional view along line 8—8 of FIG. 2.
Figure 10:
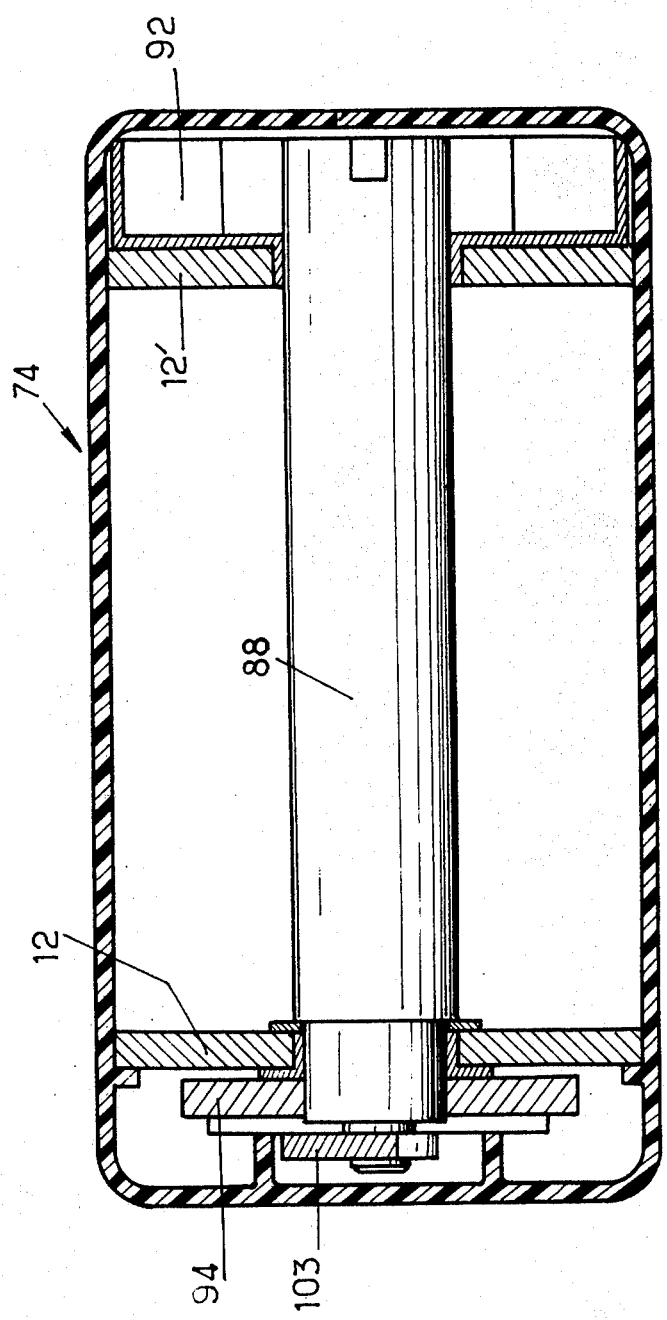
FIG. 10 is a sectional view along line 10—10 of FIG. 2 but on a slightly enlarged scale.

Keyed onto the latter, at the end opposite to where the spring 92 is fixed, is a ratchet wheel 94 the teeth 95 of which have substantially radial bearing faces 96, FIG. 8. A pawl 97 is adapted to cooperate with the ratchet wheel 94, FIGS. 8 and 9, having a flat operating face 98 and rotatably mounted on a spindle 99. Said spindle is located in holes 31 and 31' in side members 12 and 12', the main spindle 88 being located, with insertion of bearings 89 and 90, in the circular openings 21 and 21' of said side members. A circular notch 101 opens into the face 98 of the pawl 97, in which is located the tubular foot 102 of a lever 103, advantageously of plastics material, the other end of which 104 is rotatably mounted around a circular boss 105 of lug 52. Said lever also serves to hold the spring 65, being itself held by rim 106. The other spring 65' is held by a washer 107.

Cross-pieces 108 and 109, provided between side members 12 and 12' of the frame are located in notches 27 and 28 of the same.

Operation is as follows:

The strap 110 of the lap strap being fastened in the passage 34 of flange 33, at maximum storage of the strap 87, under the action of spring 92 — in this position the device according to the invention is at the height of the hand of the occupant of the seat equipped with the belt comprising the device. Springs 65 and 65', which exert a force on the lever 103 tending to make this lever function in such a way that the pawl 97 does not cooperate with the ratchet wheel 94, maintain the device in the state in which strap can be unwind when required. Taking the device by its case, the shape of which is easy to hold, the occupant pulls it down, which unrolls the strap 87 against the action of the spring 92. He puts the catch 36 into a matched slot in the part of the case forming the end of the common strap, which is rigid in most current installations, and pushes it into said slot until the latch cooperates with opening 37, which effects closure or buckling of the belt. The action of spring 92 keeps the strap of the shoulder strap under tension against the occupant's chest, the counter-force being supplied by cooperation of the latch and catch. The tension exerted by the catch 35 brings the lugs 52 and 52' towards the left end of the guide channels 22 and 22' and, in this position, the lever 103 brings the pawl 97, by rotation around spindle 99, into a position in which the front face 98 of the pawl cooperates with a bearing face 96 of a tooth of the ratchet wheel 94, which prevents the strap from unrolling.

Figure 11:
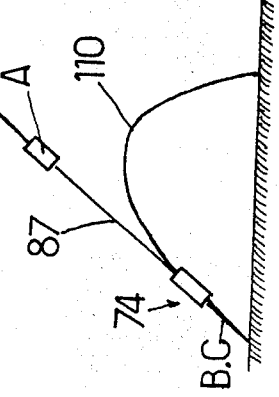
FIG. 11 is a sketch of a safety belt with buckle.

The belt is in its safety position. In case of impact, it restrains the user effectively. The top anchor point of the shoulder strap can comprise an energy absorber A, FIG. 11, functioning for example by compression, increasing the effectiveness of the protection.

If, for any reason, the user wishes to lessen pressure exerted by the shoulder strap on him, for example if he wishes to lean forward to reach an article placed in the glove box of the dashboard, all he has to do is to push the case of the device with his hand in the direction of the common strap B.C. The catch remains immobilised by cooperation with the latch of the buckle, but the case 74 and frame 11 unit moves in relation to the catch, lugs 52 and 52' sliding in guide channels 22 and 22'. The kinematic system formed by lever 103 and pawl 97 resumes the position shown in FIG. 8, the ratchet wheel 94 is no longer in a position of cooperation with pawl 97 and the amount of strap required to allow the movement to be executed unrolls from the device. When the occupant straightens his chest, spring 92 automatically re-rolls the amount of strap, the diagonal strap remaining applied against the occupant's chest. When he releases the case, the action of spring 92 which is constantly under tension stretches the strap which, as explained above, brings the kinematic system back into its position in which the pawl 97 again locks the ratchet wheel 94.

A safety belt equipped with the device according to the invention advantageously comprises a second winding-unwinding device mounted at the end of the lap strap opposite to the common strap.

Figure 12:
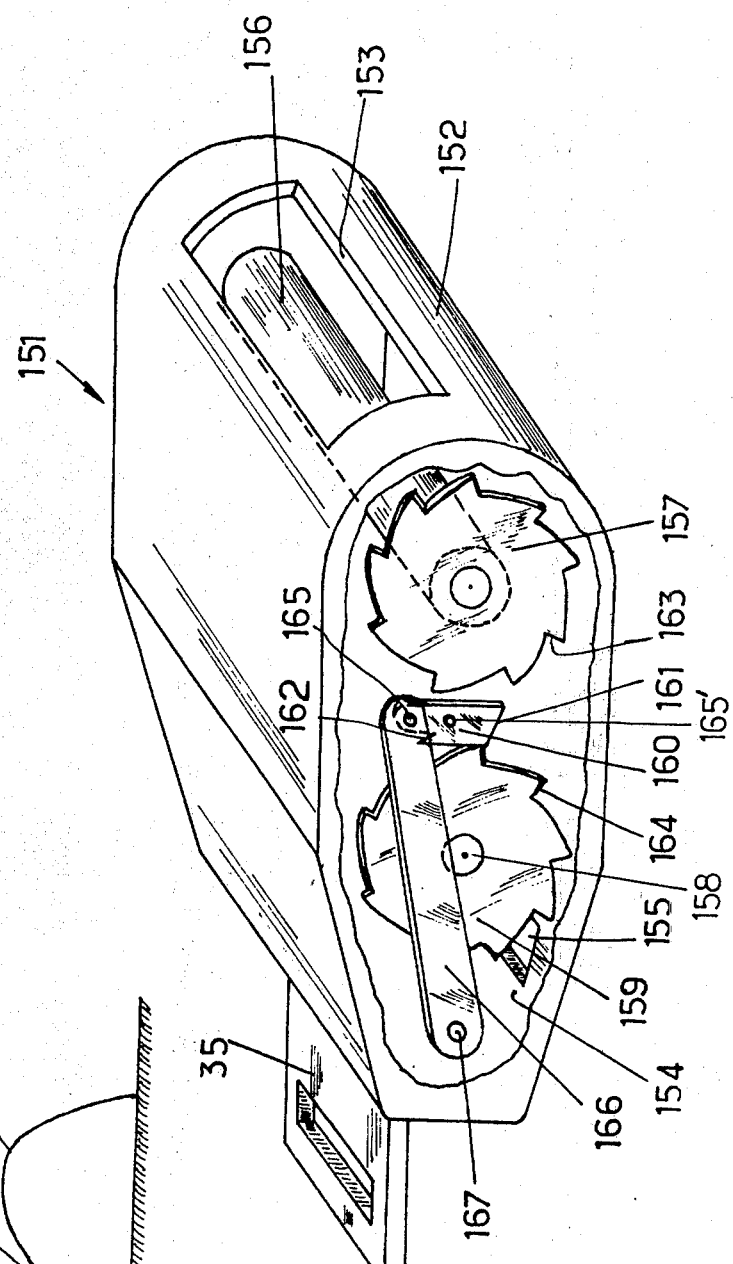
FIG. 12 is a diagrammatic perspective view of a device according to another embodiment of the invention.

The invention therefore contemplates a preferred embodiment of the device which incorporates the second winding-unwinding device. In this embodiment, the case 151 (FIG. 12), of the same general shape as in the previous embodiment, has on its rear face 152 a first aperture 153 for passage of the shoulder strap and, on its bottom face 154, a second aperture 155 for passage of the lap strap.

The shoulder strap comes off a drum 156 the spindle of which carries a ratchet toothed wheel 157. Inside the case 151 a second drum is located off which comes the lap strap and of which the spindle 158 carries a second ratchet toothed wheel 159. Cooperating with each of the teeth of the ratchet wheels 157 and 159 is the same pawl 160 having two noses or front bearing faces 161 and 162, the first being capable of cooperating with bearing faces 163 of wheel 157 and the second with bearing faces 164 of wheel 159. The pawl 160 is rotatably mounted at one end, around a spindle 165 at the end of a lever 166 rotatably mounted at its other end around a spindle 167 and which fulfils the function of the lever 103 of the preceding embodiment and, at the other end around a spindle 165'.

Operation is identical to that of the embodiment described above. Traction exerted by the user simply by taking the case 151 from its inoperative position to buckle the belt, unrolls sufficient lengths of lap and shoulder straps. When the catch 35 is engaged in the corresponding latch of the buckle, the action of the springs in the device 151 acting on each of the drums puts said straps under tension. By the traction exerted by the catch, the lever 166 brings the pawl 160 into its position locking the ratchet wheels 157 and 159.

To reduce the pressure applied by the strap onto his body, the user causes relative movement of the case 151 in relation to the catch 35; the ratchet wheels are released and the user can move his chest. When he straightens up, the straps are again applied under tension by the action of their respective springs. By releasing the case, the ratchet wheels are again in their locking position.

What I claim is:

1. A device for a buckle type safety belt comprising a generally u-shaped frame member having opposed side walls connected by a forward wall, each of said sidewalls having a generally keyshaped opening comprising a first circular opening and a forwardly extending channel and a second circular opening in its rearward portion, said forward wall having a third opening for receiving catch plate means having an aperture for engaging external buckle means, lug means slidably mounted in each of said forwardly extending channels, said catch plate means having a forward end portion extending outwardly of said frame member through said third opening and a rearward end portion slidably mounted in said channels and adapted to engage said lug means, first spindle means rotatably mounted in and supported by each of said first circular openings, and adapted to carry a strap member, second spindle means rotatably mounted in and supported by said second circular openings, ratchet wheel means mounted on said second spindle means, pawl means rotatably mounted on said second spindle means, lever means connecting said lug means and said pawl means, and wherein forward sliding movement of said lug means causes said lever means to rotate said pawl means into locking engagement with said ratchet wheel means and rearward sliding movement of said lug means causes said lever means to rotate said pawl means into non-locking position, wherein said pawl means does not engage said ratchet wheel means, said first spindle means being spring-biased to urge said pawl means and said ratchet wheel means into locking engagement.

2. A device according to claim 1 wherein spring means, attached to said lug means, forcibly engages said lever means whereby to move said pawl to nonlocking position.

3. A device according to claim 1 wherein said frame member is enclosed by a casing provided with a forward opening for receiving said latch plate means and a rearward opening adapted to permit passage therethrough of a strap member.

4. A device according to claim 1 wherein the top of said forward wall is integral with an oblique wall portion extending upwardly and rearwardly of said forward wall, said oblique wall portion having an opening for receiving strap or beltfastening means.

5. A device according to claim 1 wherein said casing is of biprismatic shape.

6. A device for a buckle type safety belt comprising a casing having top and bottom wall portions connected by opposed forward and rearward end wall portions, and opposed sidewall portions, said casing having a first aperture for admitting a first strap member in its rearward end wall portion, a second aperture for admitting a second strap member in its bottom wall portion, and a third aperture in said forward end wall portion for admitting catch plate means provided with a fourth aperture for engaging external buckle means, first rotatable drum means mounted on first spindle means adjacent said first aperture and adapted to carry a first belt member, first ratchet wheel means mounted on said first spindle means, second rotatable drum means mounted on said second spindle means adjacent said second aperture and adapted to carry a second belt member, second ratchet wheel means mounted on said second spindle means, pawl means positioned between said first and second ratchet wheel means having an upper portion mounted on third spindle means and a lower portion mounted on fourth spindle means, said third and fourth spindle means being substantially vertically disposed, said pawl means having a first bearing surface movable to locking engagement with said first ratchet wheel means and a second bearing surface movable to locking engagement with said second ratchet wheel means, lever means connecting said third spindle means with fifth spindle means positioned forwardly of said second spindle means, said first and second drum means being spring-biased to urge said pawl means and said first and second ratchet wheel means into locking engagement and wherein rotation of said second spindle means in a first direction causes said lever means to move said pawl means to locking engagement with respect to said first and second ratchet wheel means and rotation of said second spindle means in a second direction causes said lever means to move said pawl means to nonlocking engagement with respect to said first and second ratchet wheel means.

* * * * *